Oct. 26, 1965  E. W. ROWLAND-HILL  3,213,601
DUAL GRAIN TANKS FOR A COMBINE
Filed Oct. 4, 1962  2 Sheets-Sheet 1
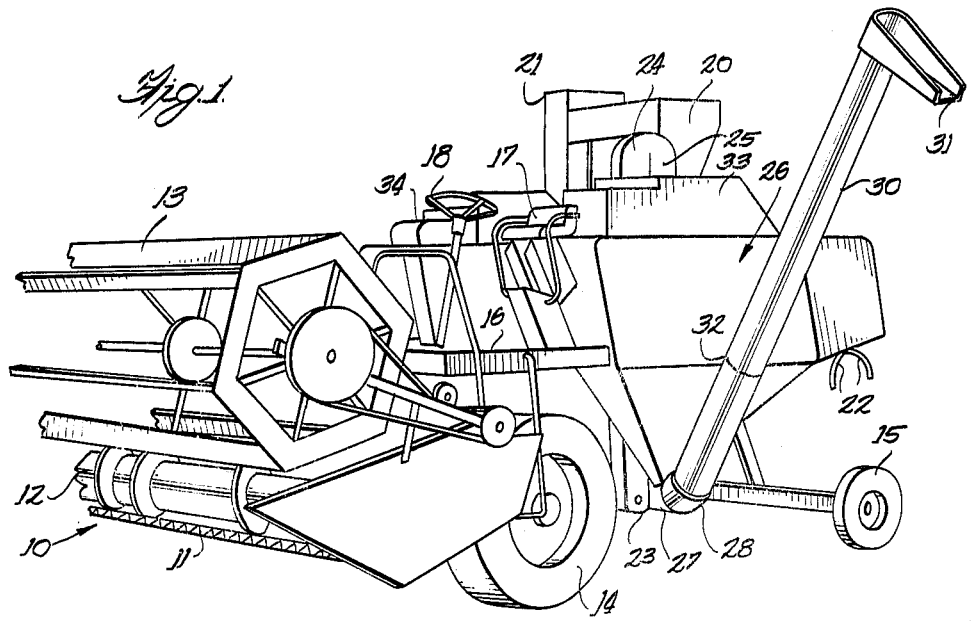
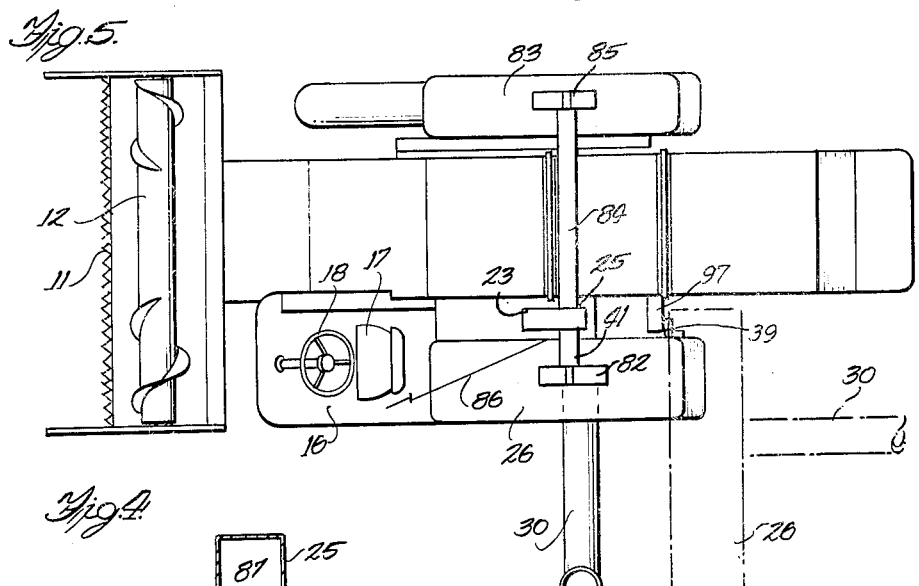
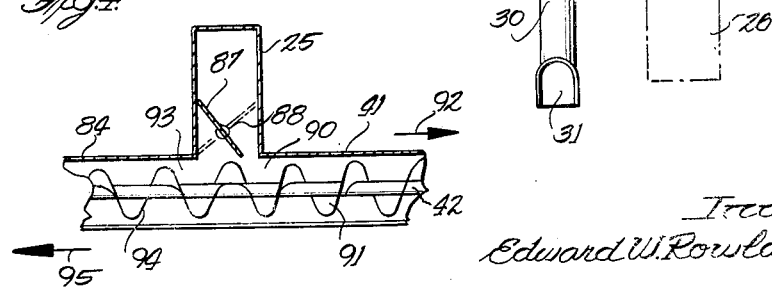
Inventor
Edward W. Rowland-Hill
Attorney

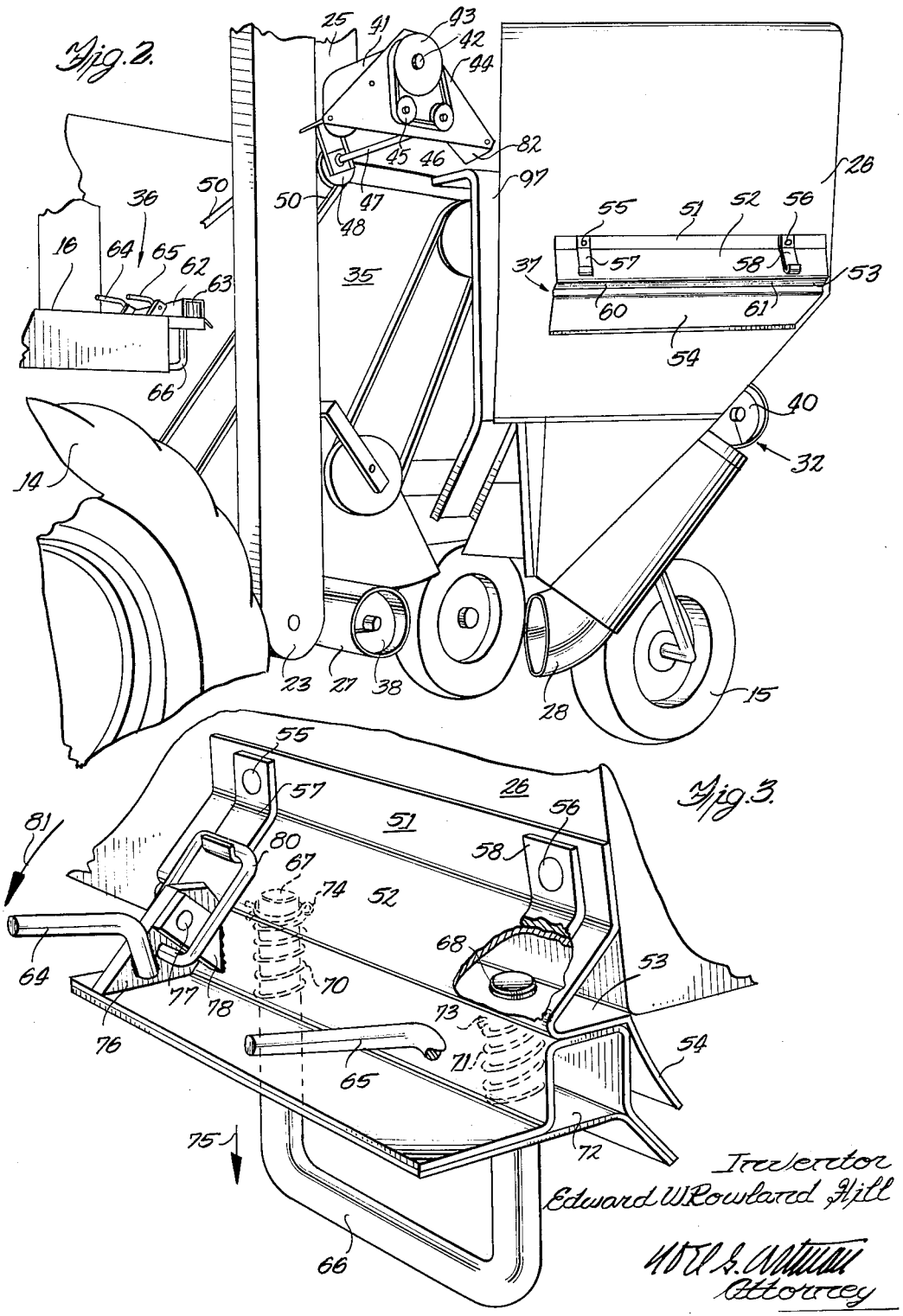

United States Patent Office 3,213,601
Patented Oct. 26, 1965

3,213,601
DUAL GRAIN TANKS FOR A COMBINE
Edward W. Rowland-Hill, Bettendorf, Iowa, assignor to International Harvester Company, Chicago, Ill., a corporation of New Jersey
Filed Oct. 4, 1962, Ser. No. 228,484
2 Claims. (Cl. 56—473.5)

This invention is directed to a novel combine construction, and more particularly to a construction which substantially enhances the grain-carrying capacity of the combine while at the same time gives significant control over the effective center of gravity of the unit, thus affording more stable operation on sloping terrain.

Both the configuration and the location of the grain storage unit(s) on a combine are important because in a large machine such as a combine with a plurality of individual operating components, the realization of a structurally sound machine in addition to one which is well balanced requires careful consideration of all the various components' location and shape as well as their weight. In many commercial combine stylings, a single grain tank has been utilized and mounted centrally of the machine adjacent or over the separator structure. Frequently, the grain tank is mounted as the uppermost component of the combine, but it is usually not desirable to reposition the various units and move the grain tank nearer the ground line because the tank cannot be considered as a component of constant weight. Frequently the combine must be run in the transport condition between one field and another, sometimes along roadways, and many times in the field it is operating with little or no grain in the tank. Under such conditions it is desirable that the other components, which do not vary in effective weight, be positioned lower on the combine frame, so that the lighter grain tank structure frequently appears as the uppermost unit of the combine arrangement. It is, of course, undesirable to make the ground-to-combine-top vertical dimension any greater than is absolutely necessary, inasmuch as this clearance dimension determines the requisite dimensions of the structure such as the barn in which the equipment is stored when not in use. It is further undesirable to make the grain tank of substantial grain holding capacity, inasmuch as the filling to the top of a very large grain tank would result in the positioning of a large weight at the upper part of the combine and decrease the stability of the unit when traveling over the field.

It is therefore a primary object of the present invention to provide a combine arrangement in which the grain tank configuration is such as to substantially reduce the height of the combine structure, while at the same time greatly increasing the grain-storing capacity of the unit.

A related object of the invention is to provide such increase in grain tank storage ability without significantly diminishing the accessability to the drives and components mounted on the sides of the separator unit in the combine.

A more specific object of the invention is to provide increased grain tank capacity by providing a plurality of grain tanks, with a novel control system for regulating the feed of the grain into one, the other, or both of the grain tanks in any desired proportion thereby to provide a desired hill-holding or stability characteristic for the combine.

The foregoing and other objects are realized, in one embodiment, by providing a combine having a separator unit with a pair of side panels and a first grain tank affixed to the combine alongside one of the side panels. Another grain tank is positioned at the other side of the combine and is coupled, by means including a hinge connection with a vertical pivot axis, to the other side panel of the separator. The second grain tank is spaced therefrom by a clearance distance to define an area in which the belts, drives and other components normally found along the side of the separator can be readily mounted. Locking means is provided at the hinged grain tank to provide for simple locking and unlocking to facilitate the swinging of the grain tank outwardly to provide access to the components on the separator side. It is emphasized that the provision of the vertical pivoting axis facilitates such disposition of the grain tank even when a substantial amount of grain is present therein.

In accordance with another aspect of the inventive teaching, a diverter valve arrangement is provided and coupled to a transverse auger which carries the grain from the clean grain elevator into one, the other, or both of the grain tanks simultaneously, depending upon the instantaneous position of the diverter valve. With the feed control and grain tank of the invention, it has been found possible to add extension sides to the grain tanks and increase the capacity significantly beyond the normal capacity, with the feed or grain delivery arrangement operable to fill each of the grain tanks without voids and thus effect an efficient operation.

The best mode contemplated for carrying out the invention will now be described. To enable those skilled in the art to make and use the invention, such description is set forth in connection with the accompanying drawings, in the several figures of which like reference numerals identify like elements, and in which:

FIGURE 1 is a perspective illustration of a combine having some parts broken away particularly illustrating a hinged grain tank at one side thereof in accordance with the inventive teaching;

FIGURE 2 is a partial perspective view, similar to a portion of FIGURE 1 but taken on a scale enlarged with respect thereto, depicting the hinged tank rotated away from the side of the separator;

FIGURE 3 is an illustrative perspective showing taken on a scale enlarged with respect to that of FIGURE 2, of the locking means for the hinged grain tank;

FIGURE 4 is a cross sectional front view of the clean grain distributing system of this invention; and FIGURE 5 is an illustrative top view of the combine depicting both the grain tank and the transverse grain delivery auger therebetween and also the position of the hinged grain tank and the discharge chute in their outward position is depicted in broken lines.

FIGURE 1 depicts a combine with a platform unit 10 at the front thereof, including a cutter bar assembly 11, an auger arrangement 12 for gathering the cut crop material centrally, and a reel unit 13 for presenting the standing crop material uniformly against the cutter bar. Most of the various drive arrangements are not depicted, being well known and understood in this art.

The separator portion of the combine is located centrally thereof, generally between the front wheels, one of which is referenced by numeral 14, and the rear wheels, one of which is indicated by numeral 15. An operator's platform 16 is provided in the upper forward portion of the combine, just ahead of the separator unit, and a seat 17 is provided for the operator slightly to the rear of the steering wheel 18. Motive power for the combine and power to operate all of the various drives is derived in well-known manner from an engine 20, shown positioned adjacent a filter or screen 21 at the upper rear portion of the combine. Certain of the chaff and other waste material which passes through the body of the separator is spread by a spreader unit including bars 22 at the lower rear portion of the separator housing, and the clean grain is collected below the separator. In well-known manner the clean grain is elevated by an elevator, starting at the bottom portion 23 of the clean grain elevator, being raised upwardly and through an arcuate portion 24 of this elevator for descent through the portion 25 into engagement with a control valve (see FIGURE 4). As will be explained more fully hereinafter, the control valve diverts the clean grain into either the hinged grain tank 26, an important feature of the present invention and located at the left side of the separator housing, or into the other grain tank 83, positioned at the right side of the separator housing (see FIGURE 5).

Unloading is accomplished by a transverse auger arrangement 27 which passes beneath the combine structure, initially taking the grain from the right hand grain tank, passing it under the body of the separator, collecting additional grain from the left hand grain tank 26, passing the total grain flow through an elbow 28 and the discharge chute 30 of the grain unloading system for descent through the trough 31 into an adjacent wagon or other depository. A hinge arrangement 32 is provided in the unloading system, so that the main portion of delivery tube 30 can be swung downwardly and rearwadly and present a minimum lateral dimension when the combine is being transported from one location to another. In FIGURE 1 a pair of grain tank extensions 33 and 34 are indicated, being affixed to the grain tanks at the left and right side respectively of the combine. The use and operation of such extensions will be referred to hereinafter. For purposes of the present specification and the appended claims, the "front" of the combine unit is the direction looking forward from the operator's position, and the "rear" or backward direction is that direction backwardly from the operator's normal position. The "left" and "right" directions refer to such directions when looking from the rear toward the front of the machine.

In FIGURE 2 the left side grain tank 26 is swung outwardly about hinges 39 (see FIGURE 5) from the left side panel 35 of the separator to the position indicated. This is accomplished by unlocking the mechanisms including the locking mechanism 36 disposed on the after section of the operator's platform 16, and the cooperative locking assembly 37 positioned on the forward portion of grain tank 26. Elbow 28 is shown rotated away from the unloading conveyor section 27, and the conveyor unit includes a terminal portion 38 constructed for mating engagement with a similar portion (not shown) housed within elbow 28. A similar cooperating auger portion 40 is depicted at the hinge area 32 upwardly on the unloading auger arrangement.

Shown in the upper portion of FIGURE 2 is the structure beneath the section 25 of the clean grain delivery channel which receives the clean grain. Within housing portion 41 is an anger 91 (see FIGURE 4) for delivering the grain dropped at a first input location, or at a given side, of the input area transversely outwardly to be deflected by shield 82 downwardly and rearwardly into grain tank 26 when it is in its inboard or normal operating position. The auger 91 within housing 41 is mounted on a central shaft 42 which extends beyond the housing and supports a sheave or drive pulley 43, around which a drive belt 44 is positioned. Belt 44 also passes around an idler pulley 45 and the drive pulley 46, the drive pulley being mounted on a shaft 47 which in turn is driven by a pulley 48 and a second drive belt 50. The displacement of drive belt 50 can be effected from the shaft on which the threshing cylinder is mounted, or from any of the multiplicity of other drive mechanisms available at the side of a combine unit. Those skilled in the art will recognize that there are many such sources of energy available.

To accommodate the various drives and other units attached to side panel 35 of the combine, it is noted that a support member 97 is affixed to the side of the combine and this member includes a top portion substantially parallel with the combine, a side portion extending downwardly substantially parallel with the side of the separator unit, and a lower portion extending toward the side of the combine for affixing thereto by welding, bolts, or other means. It is this member to which the rear end of grain tank 26 is affixed by means such as hinges 39 (see FIGURE 5). It is noted that when the grain tank 26 is rotated to the normal operating position, a clearance space is defined between the interior portion of grain tank 26 and side panel 35. Further, structural rigidity for the combine unit is afforded by the rectangular arrangement including side panel 35 of the separator unit, structural member 97, grain tank 26, and the rear portion of operator's platform 16 to which suitable locking means is affixed. This locking arrangement for selectively locking and unlocking grain tank 26 will not be described.

Considering the first locking assembly 37 (see FIGURES 2 and 3), the main component of this assembly is a metal plate suitably bent or deformed to define a first portion 51 substantially flush with the front portion of grain tank 26, a second portion 52 which flares outwardly away from the grain tank, a re-entrant or shoulder portion 53 directed back toward the grain tank, and another portion 54 which extends downwardly and rearwardly from the re-entrant portion. A pair of rivets or other connectors 55 and 56 can be utilized to pass through a pair of J-shaped hooks 57 and 58 and fasten not only these hooks but also the abutting portion 51 of the large locking means flush with the grain tank 26. It is also noted that the re-entrant or ledge portion 53 defines a pair of circular apertures 60 and 61 therein for purposes which will be explained shortly.

Visible in FIGURE 2 as components of locking assembly 36 are a substantially square-shaped (in cross-section) beam 62 which includes a shelf-like surface 63, a pair of locking and unlocking handles 64 and 65 for over-center units to be described hereinafter, and a pull-to-release unlocking handle 66. The locking assemblies and the manner in which they fit together will now be described in connection with FIGURE 3.

As there is shown, grain tank 26 is in the normal operating position aligned substantially parallel to the separator side panel 35, and locking assembly 37 is resting on and engaging locking assembly 36. That is, the extremities 67 and 68 of release handle 66 are extending into the correspondingly-dimensioned apertures 60 and 61 in the re-entrant portion 53 of the other locking assembly. Locking handle 66 is normally urged upwardly into the position illustrated by a pair of bias elements such as springs 70 and 71, retained between surface 72 of locking assembly 36 and a pair of suitable locking elements such as cotter pins 73 and 74. It is thus manifest that a downward pull on handle 66 in the direction of arrow 75 will overcome the bias force of springs 70 and 71 and lower the extremities 67 and 68 of the locking handle below locking assembly 37.

In the over-center locking device including handle 64, the handle is affixed by welding or other means to the main arm 76 of this device, which arm is journaled on a shaft 77 fitted in a bore portion of support 78. A hook or link element 80 has one end passing through the main arm or block 76, so that rotation of handle 64 in the direction indicated by arrow 81 is effective to securely lock link 80 in the position illustrated and thereby lock the grain tank in position with shoulder 53 flush with ledge 63. The other over-center unit including handle 65 is structurally and operationally similar, so that a secure interlocking arrangement is provided between the grain tank and the locking assembly at the rear of the operator platform. In spite of the secure and positive action of the locking arrangement, the assembly can readily be unlocked by pulling the handles 64 and 65 upwardly in a direction opposite that referenced by arrow 81, and pulling the unlocking handle 66 downwardly to remove the indexing portions 67 and 68 from the mating apertures in shoulder 53.

Referring to FIGURE 4 which should be considered in conjunction with FIGURE 2, a deflector or valve means 87 is shown journaled on a shaft 88, which in accordance with the inventive concept can be coupled over a suitable linkage to a location adjacent the operator's position. In the position illustrated the grain falling downwardly after delivery by the clean grain elevator is deflected to a first input location or area, as referenced by numeral 90, to fall downwardly on auger section 91 within housing 41. The pitch of this auger is such as to carry any grain received at the first input location in the direction indicated by arrow 92, for descent into the left hand grain tank 26. Conversely, with the position of valve or deflector 87 altered to deflect the falling grain to a second input location referenced by numeral 93, the auger section 94 within housing 84 is pitched to carry the grain to the left or in the direction of arrow 95, to fall into the right hand grain tank. With deflector 87 positioned exactly vertically the incoming grain is evenly divided between the two auger sections, and thus evenly divided among the left and right grain tanks. When the combine is operating on level ground, such a position may be desired to maintain the center of gravity in the central position, thereby obviating the possibility of the platform tilting and digging into the dirt. Conversely, when operation on a slope of lesser or greater gradient occurs, the operator can readily adjust the position of the deflector valve to vary the proportion of grain in each of the two saddle bag-type grain tanks thereby, to adjust the center of gravity of the machine for maximum safety and efficiency of operation.

In the illustrative showing of FIGURE 5, the other grain tank 83 is visible at the right side of the combine. As seen in FIGURE 2, shaft 42 rotates in a counterclockwise direction and thus auger 94 throws the material rearwardly. This is true because when material such as grain is moved through a housing by an auger the grain collects in the bottom of the housing and when the housing terminates the counterclockwise rotating auger tends to throw the grain in the bottom portion of the housing rearwardly. Gravity will act upon the rearwardly thrown grain to add a downward component to this motion, and in addition an inclined shield 82 is positioned such that the thrown grain will strike the shield and fall into the rear position of the grain tank 26. As noted previously, certain of the grain falling through section 25 adjacent the clean grain elevator passes through a housing 41 and is deflected by shield 82 to fall downwardly and rearwardly in grain tank 26. The oppositely pitched auger portion 94 passes grain from the clean grain elevator transversely through a housing 84 toward the right side of the combine, to be thrown under the impetus of this auger 94 and shield 85, in the same manner as auger 91 and shield 82, downwardly and rearwardly in the right hand grain tank 83. A suitable linkage 86 can be provided in a well known manner from a position adjacent the operator's seat 17 to the point at which the diversion of the clean grain is to be regulated into one, the other, or both of the grain tanks 26 and 83.

As noted previously herein, a deflector such as deflector 82 illustrated in FIGURE 2 provides for the throwing of the clean grain downwardly and rearwardly in the grain tank at each side of the combine. It has been determined that with this feeding arrangement, the tank at each side fills gradually from the bottom and toward the rear in a direction upwardly and forwardly until the complete tank is filled. Further, when extensions for the side grain tanks such as extensions 33 and 34 depicted generally in FIGURE 1 are utilized, the grain level continues to rise upwardly so that the upper rear portion of the extension is filled first and then gradually the grain level in the front portion rises until the complete extension is filled. This may be caused by the positive input pressure in which the side delivery auger extending from each side of the diverter valve positively directs the grain into the side tanks, thus affording a regular and efficient filling of both the grain tank and the extension when applied thereto.

While only a particular embodiment of the invention has been described and illustrated, it is apparent that modifications and alterations may be made therein. It is therefore the intention in the appended claims to cover all such modifications and alterations as may fall within the true spirit and scope of the invention.

What is claimed is:

1. In a combine having a clean grain elevator and having a separator unit with spaced-apart side panels, a first grain tank affixed to one of said side panels and spaced therefrom to provide a clearance area, a second grain tank positioned parallel with the other of said side panels and spaced therefrom, means including at least one pivotal coupling unit aligned along a vertical pivot axis to facilitate horizontal rotation of said grain tank away from said other side panel and thus provide access to the drive elements thereon, grain delivery means having first and second input locations and positioned to feed grain from said first input location into one of said grain tanks and from said second input location into the other of said grain tanks, valve means interposed between said clean grain elevator and said grain delivery means, for regulating the volume of grain fed to said first and second input locations and thereby effecting a corresponding regulation of the amounts of grain stored respectively in said first and second grain tanks to control the overall weight distribution of the combine unit, and a clean grain unloading system comprising a first conveyor section disposed beneath the bottom portion of the separator unit and in communication with said first grain tank, a second conveyor section disposed beneath said second grain tank in communication therewith and having an elbow portion disposed for interlocking engagement with said first conveyor section.

2. The invention as set forth in claim 1 wherein an operator's platform is affixed to said other of said side panels and extends outwardly therefrom, first locking means disposed on said operator's platform, and a second locking means disposed on the forward end of said second grain tank for interlocking engagement with said first locking means.

References Cited by the Examiner

UNITED STATES PATENTS

| 1,615,334 | 1/27 | MacGregor | 56—473.5 |
|---|---|---|---|
| 1,658,614 | 2/28 | Strand et al. | 56—473.5 |
| 1,751,601 | 3/30 | Raney et al. | 56—473.5 |
| 2,540,249 | 2/51 | Evers et al. | 56—20 |
| 2,625,001 | 1/53 | Heun | 56—473.5 |
| 2,848,858 | 8/58 | Kepkay et al. | 56—473.5 X |

FOREIGN PATENTS

| 1,225,483 | 2/60 | France. |
|---|---|---|

References Cited by the Applicant

UNITED STATES PATENTS

| 1,315,455 | 9/19 | Barby. |
|---|---|---|
| 2,589,440 | 3/52 | Sharpe. |
| 2,636,331 | 4/53 | Price. |
| 2,999,347 | 9/61 | Horne et al. |
| 3,108,703 | 10/63 | Horne et al. |
| 3,123,235 | 3/64 | Tweedale. |

ABRAHAM G. STONE, *Primary Examiner.*

CARL W. ROBINSON, T. GRAHAM CRAVER, ANTONIO F. GUIDA, *Examiners.*